(12) United States Patent
Forssell et al.

(10) Patent No.: US 6,870,820 B1
(45) Date of Patent: Mar. 22, 2005

(54) ROUTING AREA UPDATE IN PACKET RADIO NETWORK

(75) Inventors: Mika Forssell, Espoo (FI); Mikko Puuskari, Helsinki (FI)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 09/638,463

(22) Filed: Aug. 14, 2000

Related U.S. Application Data

(63) Continuation of application No. PCT/FI99/00106, filed on Feb. 11, 1999.

(30) Foreign Application Priority Data

Feb. 13, 1998 (FI) .................................................. 980340

(51) Int. Cl.[7] .............................................. H04Q 7/00
(52) U.S. Cl. ..................... 370/328; 455/445; 455/456.1
(58) Field of Search ................................ 370/328, 254, 370/331, 338, 349, 395.2, 395.21, 522, 410, 235; 455/445, 456.1

(56) References Cited

U.S. PATENT DOCUMENTS

| | | | | |
|---|---|---|---|---|
| 4,989,204 | A | | 1/1991 | Shimizu et al. |
| 5,636,217 | A | * | 6/1997 | Moelard ...................... 370/338 |
| 5,889,770 | A | * | 3/1999 | Jokiaho et al. ............. 370/337 |
| 5,970,059 | A | * | 10/1999 | Ahopelto et al. ........... 370/338 |
| 5,974,036 | A | * | 10/1999 | Acharya et al. ............ 370/331 |
| 5,978,673 | A | * | 11/1999 | Alperovich et al. ........ 455/417 |
| 6,081,723 | A | * | 6/2000 | Mademann ............... 455/456.1 |
| 6,104,929 | A | * | 8/2000 | Josse et al. .................. 455/445 |
| 6,138,020 | A | * | 10/2000 | Galyas et al. ................ 455/436 |
| 6,198,933 | B1 | * | 3/2001 | Lundin ..................... 455/456.4 |
| 6,212,379 | B1 | * | 4/2001 | Monrad et al. .......... 455/435.1 |
| 6,608,832 | B2 | * | 8/2003 | Forslow et al. ............. 370/353 |
| 2002/0031106 | A1 | * | 3/2002 | Maki et al. .................. 370/337 |

FOREIGN PATENT DOCUMENTS

| | | |
|---|---|---|
| WO | WO 97/37504 | 10/1997 |
| WO | WO 98/25422 | 6/1998 |
| WO | WO 98/32299 | 7/1998 |
| WO | WO 98/32304 | 7/1998 |
| WO | WO 98/59505 | 12/1998 |

OTHER PUBLICATIONS

Brasche et al., "Concepts, Services, and Protocols of the New GSM Phase 2+ General Packet Radio Service", IEEE Communications Magazine, Aug. 1997, pp. 97–98.*

Hamalainen et al., "Proposed Operation of GSM Packet Radio Networks", IEEE Communications, 1995, pp. 376–377.*

International Search Report for PCT/FI99/00106.

"Digital cellular telecommunication system (Phase 2+) General Packet Radio Service (GPRS)" recommendation 09.60 version 5.0.0, *ETSI*, Dec. 1–2, 1997, pp. 1–56.

* cited by examiner

*Primary Examiner*—Frank Duong
*Assistant Examiner*—Michael J. Moore, Jr.
(74) *Attorney, Agent, or Firm*—Squire, Sanders & Dempsey, L.L.P.

(57) ABSTRACT

A method of transmitting data in a packet radio network to a mobile station performing a routing area update. The packet radio network transmits data to the mobile station via a first support node. The mobile station sends a routing area update message to a second support node, which sends to the first support node a request for context data of the mobile station from the first support node. The first support node sends from its memory, end user data addressed to the mobile station to the second support node. It then waits for a predetermined period of time before sending the end user data to the second support node. The predetermined time may be fixed, depending preferably on the quality of service of the connection used by the mobile station. Alternatively the predetermined period of time expires when the second support note sends to the first support node a separate acknowledgement message indicating that the second support node has received the context data of the mobile station.

12 Claims, 3 Drawing Sheets

ROUTING AREA UPDATE IN PACKET RADIO NETWORK

This application is a continuation of PCT/FI 99/00106 filed Feb. 11, 1999.

BACKGROUND OF THE INVENTION

The invention relates to transmission of data in a packet radio network to a mobile station performing a routing area update. By way of a concrete example, the invention will be described with reference to the GPRS network, but it may be applied also to other mobile communication systems.

A General Packet Radio Service (GPRS) is a new service in the GSM. It is one of the items that are being standardized in GSM (Global System for Mobile Communication) phase 2+ at the ETSI (European Telecommunication Standard Institute). The GPRS operational environment consists of one or more sub-network service areas that are interconnected by a GPRS backbone network. A sub-network comprises a number of packet data service nodes, which are herein called GPRS support nodes (or agents) and each one of which is connected to the GSM mobile network so that it can provide packet data service for mobile data terminals via several base stations, i.e. cells. An intermediate mobile network provides circuit-switched or packet-switched data transmission between a support node and the mobile data terminals. Different sub-networks, in turn, are connected to an external data network, for example to a Public Switched Packet Data Network (PSPDN). The GPRS service can thus be used for effecting packet data transmission between mobile data terminals and external data networks, with the GSM network functioning as an access network. One of the features of the GPRS service network is that it operates almost independently of the GSM network. One of the requirements set for the GPRS service is that it must operate together with different types of external PSPDN networks, such as the Internet and X.25 networks. In other words, the GPRS service and the GSM network should be able to serve all users, irrespective of the type of data networks that they wish to be connected to via the GSM network. This means that the GSM network and GPRS service must support and process-different network addressing methods and data packet formats. The data packet processing also comprises routing of packets in a packet radio network. In addition, users should be able to roam from their home GPRS network to a visited GPRS network.

FIG. 1 illustrates a typical arrangement in a GPRS network. The architecture of GPRS networks is not as mature as that of the GSM networks. All GPRS terms should therefore be understood as being descriptive rather than limiting. A typical mobile station forming a mobile data terminal consists of a mobile station MS in a mobile network and of a portable computer PC connected to the data interface of the MS. The mobile station may be, for example Nokia 2110, manufactured by Nokia Mobile Phones Ltd., Finland. By means of a PCMCIA type Nokia Cellular Datacard, manufactured by Nokia Mobile Phones Ltd., the mobile station can be connected to any portable personal computer PC that has a PCMCIA card slot. The PCMCIA card thus provides the PC with an access point that supports the protocol of the telecommunication application used in the PC, such as the CCITT X.25 or Internet Protocol IP. Alternatively, the mobile station can directly provide an access point that supports the protocol used by the PC application. Further, a mobile station 3 and a PC 4 can be integrated to form a single unit, within which the application is provided with an access point that supports the protocol used by it. An example of such a mobile station with an integrated computer is a Nokia Communicator 9000, manufactured by Nokia Mobile Phones Ltd., Finland.

Network elements BSC and MSC are previously known from a typical GSM network. The arrangement of FIG. 1 comprises a separate Serving GPRS Support Node (SGSN). The support node controls certain operations of the packet radio service on the network side. The operations include logging on and off the system by the mobile stations, routing area updates by mobile stations MS, and data packet routing to correct destinations. In the present application, the term 'data' should be understood in the wide sense to refer to any information transmitted to/from a terminal in a digital telecommunication system. The information can comprise speech encoded into digital form, data communication between computers, telefax data, short segments of program code, etc. Information outside data transmission, such as subscriber data and related inquiries, routing area updates etc., is called signalling. The SGSN node can be located at a base station BTS, at a base station controller BSC or at a mobile switching centre MSC, or it can be separate from all these elements. The interface between the SGSN node and the base station controller BSC is called a GB interface. An area managed by one base station controller BSC is called a Base Station Subsystem BSS.

The intermediate mobile network provides packet-switched data transmission between a support node and mobile data terminal equipment. Different sub-networks, in turn, are connected to an external data network, for example to a PSPDN, via a specific Gateway GPRS Support Node GGSN. Packet data transmission between mobile data terminals and external data networks is thus accomplished by means of the GPRS service, with the GSM network functioning as an access network. Alternatively, the gateway node GGSN can be replaced with a router. In the following, the term 'gateway node GGSN' is also to be understood to refer to a structure in which the gateway has been replaced with a router.

In FIG. 1 the GPRS network connected to the GSM network comprises a number of serving GPRS support nodes SGSN and one gateway GPRS support node GGSN. The different support nodes SGSN and GGSN are interconnected via an intra-operator backbone network. It is to be understood that a GPRS network may comprise any number of support nodes SGSN and gateway nodes GGSN.

Each support node SGSN manages a packet data service in the area of one or more nodes in a cellular packet radio network. To achieve this, each support node SGSN is connected to a certain local part of the GSM system, typically to a mobile services switching centre, but in some situations it may be preferable to connect it directly to a base station subsystem BSS, i.e. to a base station controller BSC or a base station BTS. A mobile station MS in a cell communicates with a base station BTS over a radio interface and further through a mobile network with the support node SGSN to the service area of which the cell belongs. In principle, the mobile network between the support node SGSN and the mobile station MS only transmits packets between these two. For this purpose, the mobile network can offer either a circuit-switched connection or packet-switched data packet transmission between a mobile station MS and a serving support node SGSN. An example of a circuit-switched connection between a mobile station MS and an agent is presented in FI934115. An example of packet-switched data transmission between a mobile station MS and an agent is presented in FI940314. It should be noted, however, that a mobile network provides only a physical connection between a mobile station MS and a support node SGSN, and that its exact operation and structure are not relevant to the invention.

An intra-operator backbone network 11 interconnecting an operator's SGSN and GGSN can be implemented by a local area network, for example. It should be noted that an operator's GPRS network can also be implemented without an intra-operator backbone network, by implementing all features in a single computer, for example, but this does not cause any changes in the call set-up principles according to the present invention.

A gateway GPRS node GGSN connects an operator's GPRS network to other operators' GPRS networks and to data networks, such as an inter-operator backbone network 12 or an IP network. An Interworking Function IWF can be arranged between the gateway node GGSN and the other networks, but usually the GGSN is simultaneously the IWF. The inter-operator backbone network 12 is one through which the gateway nodes GGSN of different operators can communicate with one another. The communication is needed to support GPRS roaming between the different GPRS networks.

The gateway node GGSN is also used for storing the location information of the GPRS mobile stations. The GGSN also routes mobile-terminated (MT) data packets. The GGSN also contains a database that associates the mobile station's network address in an IP network or an X.25 network (or simultaneously in more than one network) with the mobile station identifier in a GPRS network. When the mobile station roams from one cell to another within the area of one support node SGSN, a routing area update is needed only in the support node SGSN, and the gateway node GGSN need not be informed of the change of routing area. When the mobile station roams from a cell of one support node SGSN to a cell of another SGSN within the area of the same or a different operator, an update is also performed in the (home) gateway node GGSN so as to store the identifier of the new, visited support node and the identifier of the mobile station.

A home location register HLR is also used to authenticate subscribers at the beginning of a GPRS session. It contains a definition between a subscriber's PDP (Packet Data Protocol) address (addresses) and the subscriber's IMSI (International Mobile Subscriber Identity). In a GSM network a subscriber is identified on the basis of the IMSI. In FIG. 1 the HLR is connected through an SS7 (Signalling System 7), for example to a mobile switching centre MSC and an intra-operator backbone network. Between the SS7 signalling system and the intra-operator backbone network there can be a direct connection or an SS7 gateway node. In principle, the HLR can exchange packet-switched messages with any GPRS node. The HLR's method of communication and its connection to the GPRS network are not, however, essential to the invention.

When packet data is sent to a mobile station, the data will be routed to the correct GSM network via the gateway node GGSN to the support node SGSN in which the location of the mobile station is known. If the mobile station is in standby mode, its location is known with the accuracy of a Routing Area (RA). Correspondingly, if the mobile station is in ready mode, its location is known with the accuracy of a cell.

FIG. 2 shows signalling associated with a routing area update. Temporally the process is from top downwards. In step 2-0 the mobile station MS receives data via the gateway node GGSN and a first support node $SGSN_1$. Next the mobile station MS moves from the area of the first (e.g. the old) support node SGSN, to the area of a second (i.e. a new) support node $SGSN_2$. In step 2-1 it sends to the new support node $SGSN_2$ a ROUTING AREA UPDATE REQUEST. In step 2-2 the new support node $SGSN_2$ sends to the old support node $SGSN_1$ an SGSN CONTEXT REQUEST message, requesting for a mobile subscribers contact information, i.e. what is known as context data, from the $SGSN_1$. In step 2-3 the old support node sends data from its memory via the new support node to the mobile station. This step will be described in greater detail in the description of the problem.

In step 2-4 the $SGSN_2$ sends the requested PDP context data. In step 2-5 the new $SGSN_2$ sends to the gateway node GGSN as many UPDATE PDP CONTEXT REQUEST messages as there are active connections to the mobile station concerned. This number is denoted by n. In step 2-6 the GGSN replies by sending n acknowledgements. In step 2-7 the new $SGSN_2$ sends to the home location register HLR a routing area update message UPDATE GPRS LOCATION. In step 2-8 the home location register HLR cancels the subscriber data of the mobile station MS in the old support node $SGSN_1$. Step 2-9 involves a corresponding acknowledgement. In step 2-10 the HLR sends the subscriber data of the mobile station in a message INSERT SUBSCRIBER DATA. Steps 2-11 to 2-15 are notices of acceptance and acknowledgements to previously sent messages.

The ETSI (European Telecommunications Standards Institute) GPRS recommendation 09.60 (version 5.0) states that the old support node $SGSN_1$ is to send data packets associated with a subscriber's PDP context after it has sent the context data (message 2-4) to the new support node. Said recommendation also states that when the new support node receives data packets associated with an unknown PDP context, the new support node is to send an error message to the old support node.

A problem in the above prior art arrangement arises when the message containing the PDP context data of step 2-4 is delayed en route or is not sent until the old support node SGSN, already has sent data to the new support node $SGSN_2$. The data stream 2-3 (divided into partial steps 2-3a, 2-3c and 2-3d) in FIG. 2 shows such a situation. In step 2-3a the old support node $SGSN_1$ receives data addressed to a mobile station MS and in step 2-3c it sends data stored in its memory and addressed to the mobile station MS to the new support node $SGSN_2$, which is to relay the data to the mobile station MS (as step 2-3d shows). However, in reality this is not the case since at this stage the new support node $SGSN_2$ has not yet received the context data on the mobile station. In other words, the $SGSN_2$ does not know what to do with the data packets.

A parallel problem arises when the tunnelling protocol GTP (GPRS Tunneling Protocol) of the new support node relays the message presented in step 2-4 and containing subscriber context data to an MM unit (Mobility Management) of the support node $SGSN_2$ for further processing. The purpose of this operation is for the MM unit to request the GTP to take corresponding measures if the subscriber has active PDP contexts, i.e. to provide the required tunnels. If data packets immediately follow the message of step 2-4, the $SGSN_2$ does not in this case either identify the PDP context with which the data packets are associated.

BRIEF DESCRIPTION OF THE INVENTION

It is an object of the invention to provide a method and an equipment for implementing the method to solve the above problems. The objects of the invention are achieved by a method and arrangement which are characterized by what is disclosed in the independent claims. The preferred embodiments of the invention are disclosed in the dependent claims.

A straightforward solution would be to buffer data packets in a new support node, but a support node will find it difficult to buffer data the subscriber data of whose real owner it is not aware of. Simple data buffering in a new support node would give rise to the following problems:

According to a chain of events, a new support node receives data packets associated with an unknown PDP context. The new support node discards the data packets and sends an error message to the old support node (which sent the data packets). The error message results in the PDP context being deleted from the registers of the old support node. As a consequence, the tunnelling associated with the context is terminated. If the new support node resends the context request (message 2-2), the old support node does not include in the reply message 24 the deleted PDP context, and thus the new support node is unaware of the subscriber's active contexts. Alternatively, the deleted PDP context is included in the reply message, but no tunnelling is performed.

According to another chain of events, the gateway node GGSN tunnels mobile-terminating data packets to the old support node. If the old support node receives data packets associated with an unknown (recently deleted) PDP context, it sends an error message to the gateway node. Having received the error message, the gateway node deletes the PDP context from its registers. If the gateway node is not sending mobile-terminating packets at the moment when the routing area between the support nodes is being updated, the gateway node assumes that the PDP context is active, even though it has been deleted from the support node.

The invention is first of all based on detecting a shortcoming in the GPRS recommendation 09.60. The invention is also based on supplementing the functionality of the support node SGSN as follows. In accordance with the invention, a condition is defined, upon the fulfilment of which it is at least probable that the second (new) support node $SGSN_2$ has at its disposal the context data of the mobile station. When the routing area is being updated, at least one support node ($SGSN_1$ or $SGSN_2$) delays data transmission until said condition is fulfilled.

The fact that the second support node $SGSN_2$ is at least likely to have at its disposal the context data of the mobile station can be ascertained in various ways. According to a first embodiment of the invention, when the location of a mobile station is updated from the old support node to a new support node, and the old support node has sent the context data of the mobile station to the new support node, the old support node waits for a predetermined period of time until its sends to the new support node data packets addressed to the mobile station concerned. The predetermined waiting time is sufficiently long to make it at least very likely that the context data has had time to reach the new support node and that the node has had time to respond to them (create required tunnels etc.).

According to an alternative, the waiting time is a fixed, empirical period of time, e.g. in the order of 2 seconds. The waiting time serves to ensure that the new support node has time to resend the request for context data (message 2-2) in case the first message disappears en route. Similarly, the old support node does not send data packets substantially simultaneously with context data, so that data packets cannot overtake context data en route. It is reasonable to make the waiting time depend on the quality of Service (QoS) so that the time is shorter at higher qualities of service, e.g. 0.5 s.

According to a preferred alternative, the new support node informs the old support node of the waiting time, preferably in the same message in which it requests context data from the old support node. This is because the new support node knows best how its retransmission timer has been set. The most suitable value for the waiting time is slightly longer than the time set for the retransmission timer. Alternatively, the new support node could naturally reveal the time set for its retransmission timer, whereby the old support node would add a small margin to it.

According to another alternative, the predetermined waiting time is not fixed, but the old support node waits for an acknowledgement from the new support node, i.e. confirmation that the new support node has received the context data it requested. Not until having received said acknowledgement does the old support node send to the new support node data packets addressed to the mobile station. In this case the new support node is not likely, but is certain to have at its disposal the context data of the mobile station.

An advantage of the second alternative is e.g. that there is no such delay as was presented in the first embodiment, associated with a routing area update, since normally the new support node sends an acknowledgement almost immediately. However, a marginal drawback is an extra acknowledgement message and the increased signalling load caused by it.

A further advantage of the second alternative is that it will solve the problem even in case a message sent in step 2-4 and containing context data should disappear en route. Even in this case the prior art new support node $SGSN_2$ is unable to receive data packets addressed to the subscriber concerned, since it has no idea what to do with the data packets. According to an advantageous alternative of a second embodiment, the $SGSN_1$ waits for the acknowledgement message for a given maximum period of time and then resends the context data.

In accordance with the second embodiment, the second, i.e. new support node delays data transmission. The following arrangement takes place in the new support node. When the new support node (and particularly its GTP unit) receives data packets not associated with any PDP context, the support node does not discard the received data packets, but stores them and checks whether a routing area update between support nodes is in progress in the support node. Should at least one such routing area update be in progress, the new support node stores the received and successive data packets which are not associated with any PDP context. These packets may be either associated with a temporary context or stored in memory, from which they are retrieved once the ongoing routing area update has been terminated.

If no routing area update between support nodes is in progress in the support node, the support node follows the prior art procedure, i.e. discards the data packets and sends an error message to the support node that sent the packets.

BRIEF DESCRIPTION OF THE DRAWINGS

The invention will be described in the following in greater detail in association with preferred embodiments with reference to the attached drawings, in which.

DETAILED DESCRIPTION OF THE INVENTION

Figure 1:
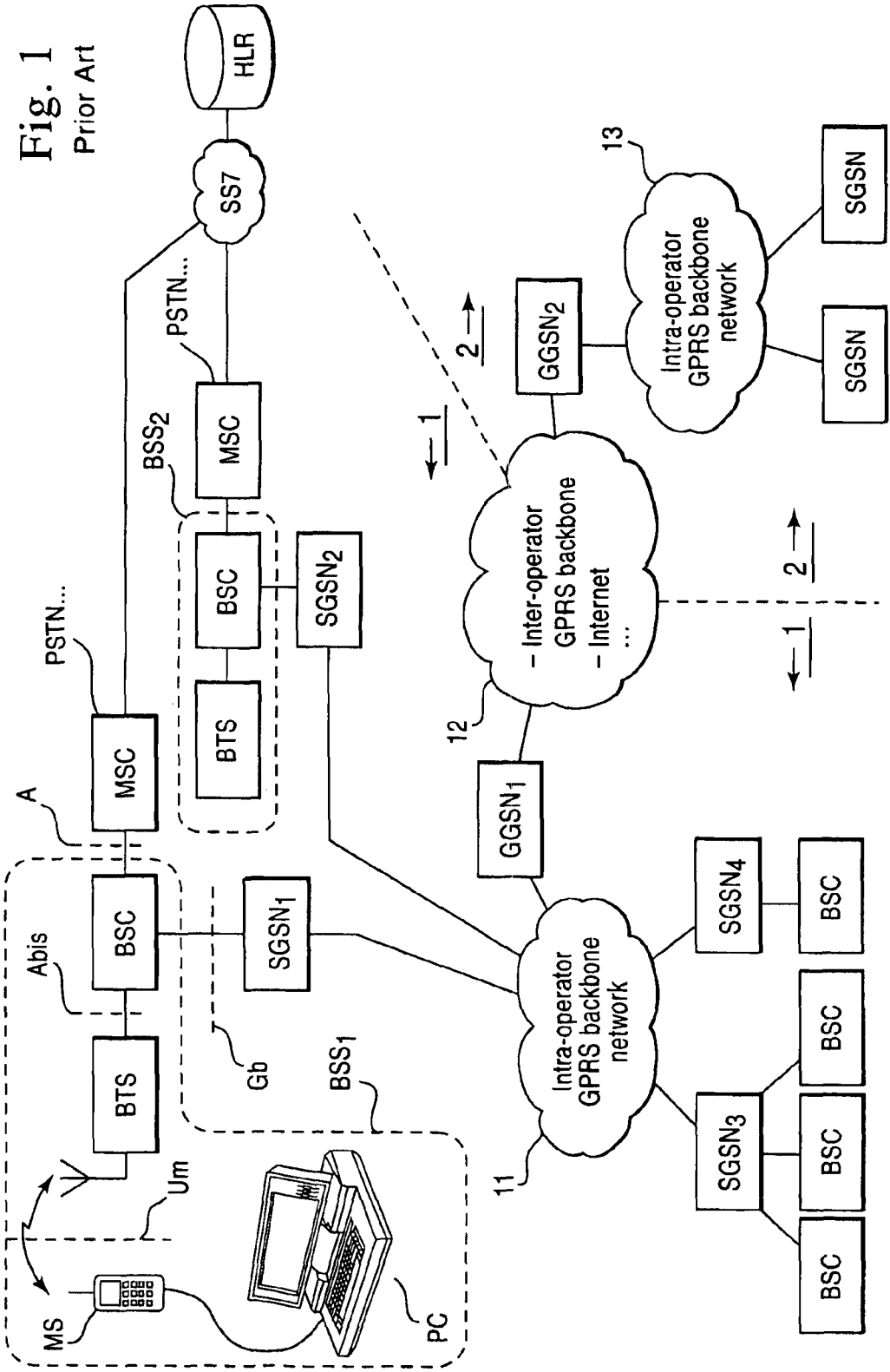
FIG. 1 shows the architecture of a packet radio network.
Figure 2:
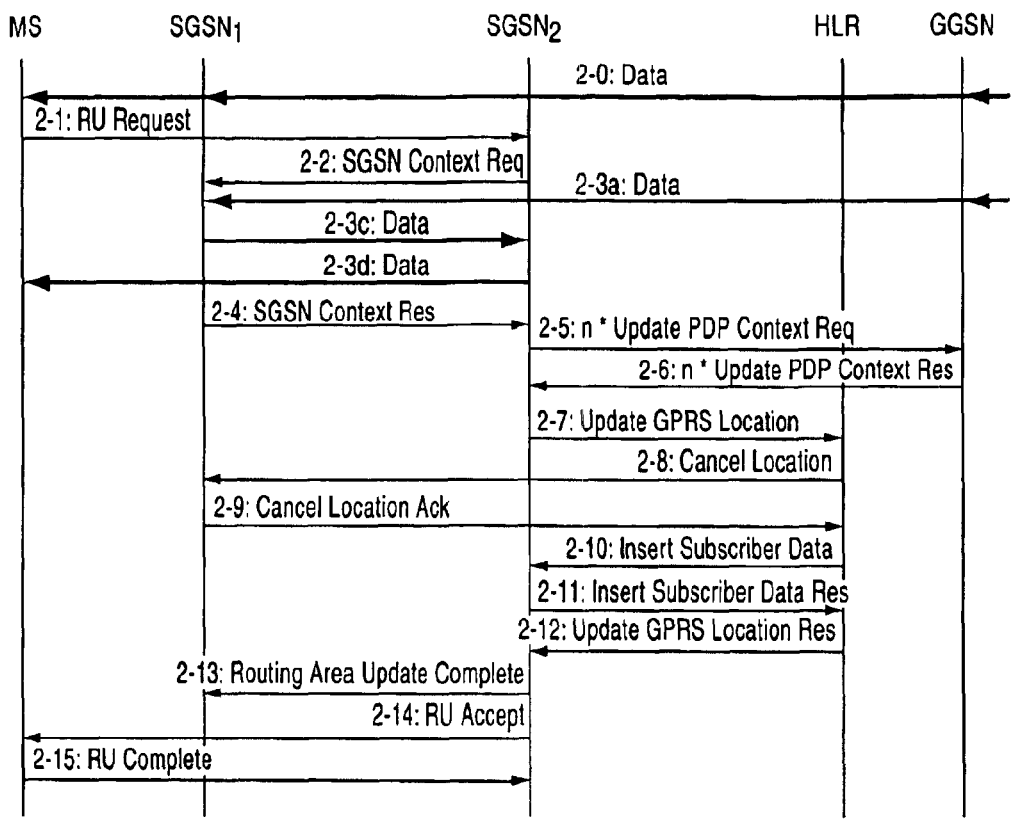
FIG. 2 shows signalling associated with routing area maintenance in accordance with the prior art.
Figure 3:
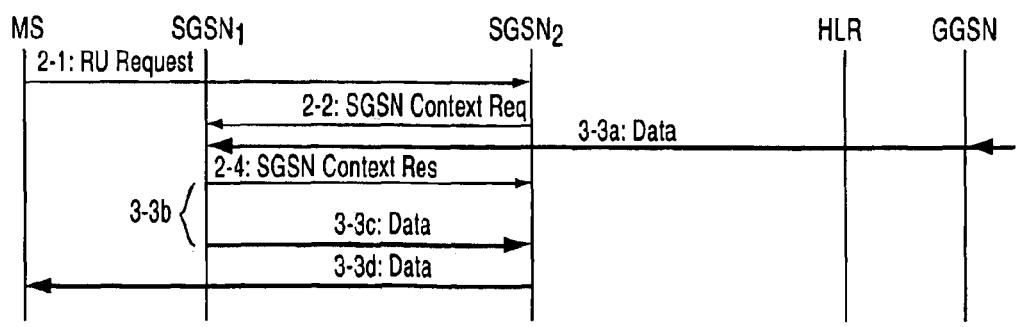
FIGS. 3 and 4 shows signalling associated with routing area maintenance in accordance with different alternatives of a first embodiment of the invention.

FIG. 3 shows signalling associated with routing area maintenance in accordance with a first embodiment of the invention. In this case the other steps are the same as were described in association with FIG. 2, but steps 2-3*a* to 2-3*d* (data transmission via the old support node $SGSN_1$) have been replaced by steps 3-3*a* to 3-3*d*. Step 3-3*a* corresponds to step 2-3*a*. In this step the $SGSN_1$ receives data packets addressed to a mobile station. In step 3-3*b* the $SGSN_2$ waits for a fixed period of time (which preferably depends on the quality of service of the connection). After the waiting time, in step 3-3*c*, the SGSN, sends the data packets in its memory to the $SGSN_2$, which relays them to the mobile station MS in step 3-3*d*. Thereafter the embodiment shown in FIG. 3 comprises steps 2-5 to 2-15, but they will not be shown nor described again.

Figure 4:
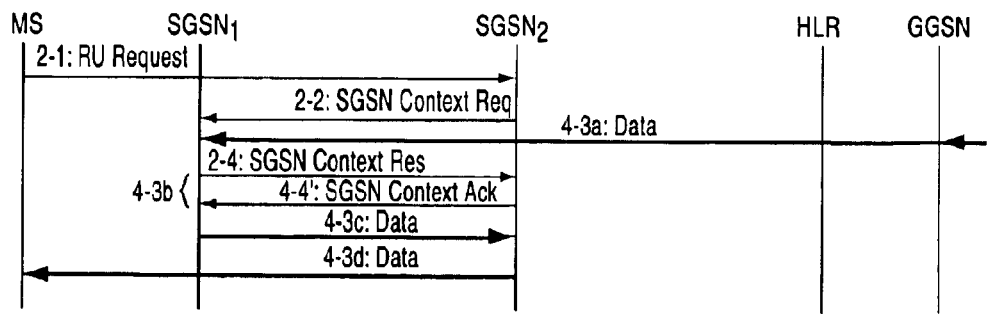

FIG. 4 shows signalling associated with routing area maintenance in accordance with an alternative implementation of the first embodiment of the invention. In this case, too, the steps, which are not separately described (2-0 to 2-2 and 2-5 to 2-15), are the same as in the prior art, FIG. 2. Steps 2-3*a* to 2-3*d* (data transmission via the old support node $SGSN_1$) have been replaced by steps 4-3*a* to 4-3*d*. In step 4-3*a* the $SGSN_1$ receives data packets addressed to a mobile station. In step 4-3*d* the old $SGSN_1$ waits for an acknowledgement message sent by the new $SGSN_2$ in step 4-4' and called herein SGSN CONTEXT ACKNOWLEDGE. In step 4-3*c* the old $SGSN_1$ sends the data packets in its memory to the new $SGSN_2$, which relays them to the mobile station MS in step 4-3*d*.

Figure 5:
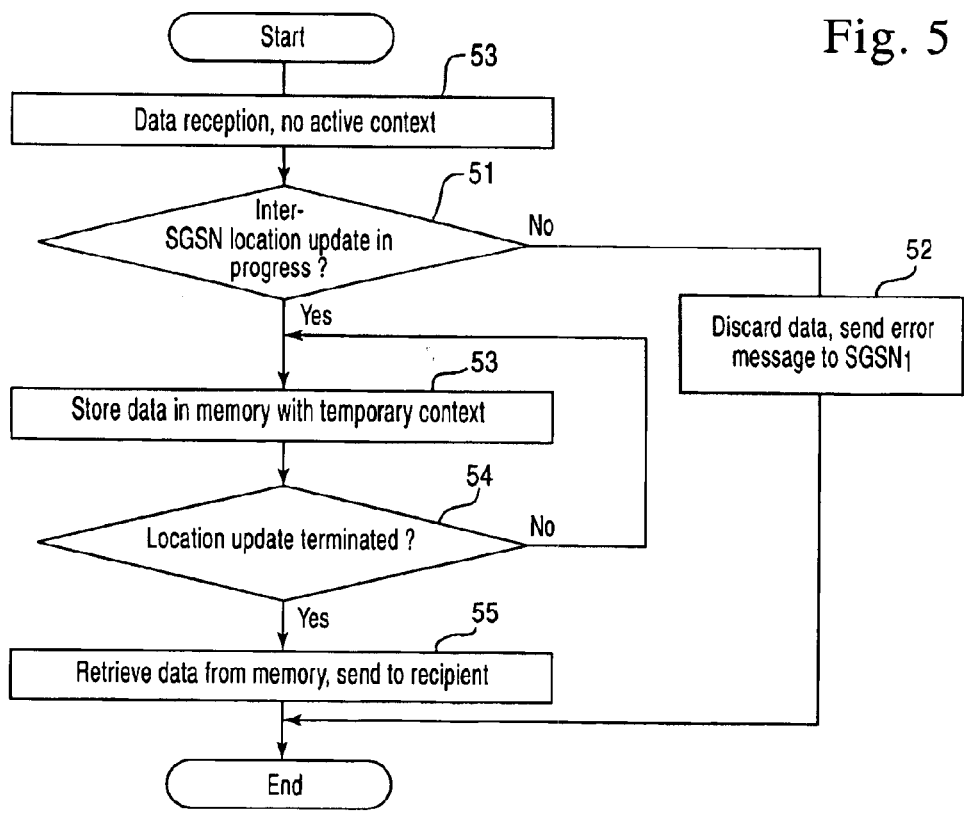
FIG. 5 is a flow diagram of a second embodiment of the invention.

FIG. 5 is a flow diagram of a second embodiment of the invention. In step 50 the new support node $SGSN_2$ (and particularly its GTP unit) receives data packets which are not associated with any POP context. In step 51 the support node checks whether a routing area update between support nodes is in progress. If so, in step 53 the support node associates the packets with a temporary context. When it is detected in step 54 that the routing area update has been terminated, the process proceeds to step 55 in which the $SGSN_2$ sends the packets to the recipient. If it is detected in step 51 that no routing area updates between support nodes are in progress, the process proceeds to step 52, in which the packets are discarded and an error message sent to the sender of the packets.

It is obvious to a person skilled in the art that as technology advances, the inventive concept can be implemented in several different ways. Thus the invention and its embodiments are not limited to the examples described above, but may vary within the scope of the claims.

What is claimed is:

1. A method of transmitting data in a packet radio network to a mobile station when the mobile station's routing area is being updated, the network comprising at least a first support node and a second support node;

in which method the packet radio network sends data to the mobile station via the first support node;

the mobile station sends a routing area update message to the second support node, which sends to the first support node a request for context data of the mobile station from the first support node;

the first support node sends from its memory data addressed to a mobile station to the second support node;

a condition is defined, upon fulfillment of which it is at least probable that the second support node has at its disposal the context data of the mobile station; and when the routing area is being updated, at least one support node, delays data transmission until said condition is fulfilled.

2. A method as claimed in claim 1, wherein the first support node waits for a predetermined period of time before sending data to the second support node.

3. A method as claimed in claim 2, wherein said predetermined period of time is fixed at least for at least one quality of service.

4. A method as claimed in claim 3, wherein the predetermined period of time depends on the quality of service of a connection used by the mobile station.

5. A method as claimed in claim 3, wherein said fixed period of time is determined by the second support node notifying to the first support node the time which substantially corresponds to a time setting of a retransmission timer of the second support node and by one of the support nodes adding a small security margin to this time.

6. A method as claimed in claim 1, wherein, before data transmission to the second support node, the first support node waits for a separate acknowledgement message from the second support node, the separate acknowledgement message indicating that the second support node has received the context data of the mobile station.

7. A method as claimed in claim 6, wherein the first support node waits for said acknowledgement message for a predetermined maximum period of time and resends the context data if it does not receive the acknowledgement message within this time.

8. A method as claimed in claim 1, wherein:

the second support node, which receives data packets for which the second support node does not have associated context data, checks whether a routing area update between support nodes is in progress; and if a routing area update between support nodes is in progress, the second support node stores the data packets in memory until the routing area update has been terminated, and then sends the packets to a recipient.

9. A support node in a packet radio network, the support node being arranged to support data transmission in a packet radio network to a mobile station performing a routing area update; wherein during a routing area update the support node is arranged to observe fulfillment of a condition indicating that a second support node is at least likely to have at its disposal context data of the mobile station; and delay data transmission until said condition is fulfilled.

10. A method of transmitting data in a packet radio network to a mobile station when the mobile station's routing area is being updated, the network comprising at least a first support node and a second support node;

in which method the packet radio network sends data to the mobile station via the first support node;

the mobile station sends a routing area update message to the second support node, which sends to the first support node a request for context data of the mobile station from the first support node;

the first support node sends from its memory data addressed to a mobile station to the second support node;

when the routing area is being updated, at least one support node delays data transmission until the second support node has at its disposal the context data of the mobile station.

11. A support node in a packet radio network, the support node being arranged to support data transmission in a packet radio network to a mobile station performing a routing area update; wherein during a routing area update the support node is arranged to delay data transmission until a second support node has at its disposal context data of the mobile station.

12. A method of transmitting data in a packet radio network to a mobile station when the mobile station's routing area is being updated, the network comprising at least a first support node and a second support node;

in which method the packet radio network sends data to the mobile station via the first support node;

the mobile station sends a routing area update message to the second support node, which sends to the first support node a request for context data of the mobile station from the first support node;

the first support node sends from its memory data addressed to a mobile station to the second support node;

a condition is defined, upon fulfillment of which it is at least probable that the second support node has at its disposal the context data of the mobile station; and when the routing area is being updated, at least one support node delays data transmission until the second support node has at its disposal the context data of the mobile station.

* * * * *